United States Patent [19]
Suzuki et al.

[11] Patent Number: 6,140,726
[45] Date of Patent: Oct. 31, 2000

[54] RADIAL GAP CYLINDRICAL MOTOR HAVING AN INCREASED NUMBER OF SLOTS

[75] Inventors: Yuzuru Suzuki; Sakae Fujitani; Masaki Kagawa, all of Shizuoka-ken, Japan

[73] Assignee: Minebea Co., Ltd., Nagano-Ken, Japan

[21] Appl. No.: 09/108,376

[22] Filed: Jul. 1, 1998

[30] Foreign Application Priority Data

Jul. 3, 1997 [JP] Japan .................................. 9-178687

[51] Int. Cl.⁷ .................................. H02K 5/04; H02K 1/14
[52] U.S. Cl. ............................. 310/89; 310/254; 310/257; 310/218
[58] Field of Search ..................................... 310/190, 216, 310/218, 269, 49 R, 87, 254, 258, 257

[56] References Cited

U.S. PATENT DOCUMENTS

| | | | |
|---|---|---|---|
| 658,012 | 9/1900 | Hurrell | 310/89 |
| 2,236,291 | 3/1941 | Kilbourne | 310/218 |
| 4,547,714 | 10/1985 | Muller | 318/254 |
| 5,710,474 | 1/1998 | Mulgrave | 310/254 |

FOREIGN PATENT DOCUMENTS

| | | | |
|---|---|---|---|
| 129679 | 9/1932 | Germany | 310/218 |
| 844233 | 8/1960 | United Kingdom | 310/216 |

*Primary Examiner*—Elvin Enad
*Assistant Examiner*—Karl I. Tamai
*Attorney, Agent, or Firm*—Staas & Halsey LLP

[57] ABSTRACT

A radial gap type cylindrical motor structure including a rotor which has a field magnet 13, a stator poles 20 having salient poles 18 opposed to the field magnet 13 of the rotor, a magnetic flux density adjusting yoke 21 formed in a cylindrical shape using a soft magnetic material and having salient poles 18, half the number of salient poles being projected as upper salient poles on an inner upper edge of the yoke inwardly at an equal angle and the remaining half of the salient poles being projected as lower salient poles on an inner lower edge of the yoke inwardly at an equal angle so as not to overlap the upper salient poles vertically, and driving coils 12 wound respectively around the upper and lower salient poles.

8 Claims, 8 Drawing Sheets

RADIAL GAP CYLINDRICAL MOTOR HAVING AN INCREASED NUMBER OF SLOTS

BACKGROUND OF THE INVENTION

1. Field of the Invention

The present invention relates to a radial gap type motor structure and more particularly to a radial gap type motor structure reduced in all of size, weight and cost.

2. Description of the Related Art

Recently, various office automation devices have been becoming higher and higher in performance, especially in operating speed. At the same time the devices have come to use a plurality of dedicated motors according to required functions. Particularly, in the case of small-sized DC motors, those enhanced in magnetic efficiency according to purposes of use, diminished in both cogging torque and electromagnetic noise and superior in controllability are desired. According to a measure adopted so far to meet this demand, the number of slots (salient poles) of a core and that of poles of a magnet are increased, whereby each magnetic circuit becomes short to decrease magnetic resistance, resulting in increase of magnetic efficiency. Further, as coil winding, there is adopted a concentrated winding to enhance the winding efficiency.

FIG. 11 shows the construction of a conventional laminated, inner rotor type brushless DC motor, and FIG. 12 is a sectional view thereof. In these figures, the numeral 1 denotes a lead wire and numeral 2 denotes a coil. A bobbin 9 is vertically fitted on each salient pole 10 of a stator 8 which formed by lamination of soft magnetic steel plates, and magnet wire is would thereon, to constitute the coil 2. Numeral 3 denotes a rotor magnet and numeral 4 denotes a sleeve which connects the rotor magnet 3 and a shaft 5 as a rotational center of a rotor with each other. Numeral 7 denotes a flange with a bearing 6 disposed centrally which bearing supports the rotor shaft 5. Two flanges 7 are formed in a sandwiching relation to the stator 8 from both sides. The tip of each salient pole 10 is formed wider than the winding portion to increase interlinkage flux with the rotor magnet 3 and hold the bobbin 9 (coil). The lamination length of the stator 8 is almost equal to the length of the rotor magnet 3 for the same reason as above.

However, as the number of slots increases, the slot spacing becomes narrower and hence the winding space is narrowed to the extent that a required volume of winding cannot be received in the winding space unless the motors size is increased. If the motor size remains the same, it is impossible to ensure a required volume of winding, so there is adopted a permanent magnet having high magnetic characteristics to obtain desired motor characteristics although this leads to an increase of cost. In the construction of the conventional lamination type stator, it is required that the lamination thickness of the stator 8 be made substantially equal to the length of the rotor magnet 3 in order to ensure a predetermined area of opposition between the salient poles 10 and the rotor magnet 3. As a result, the winding length for each turn of coil becomes larger and thus the winding efficiency is low. Besides, since the surface of each salient pole 10 opposed to the rotor magnet 3 is wide to ensure the aforesaid area of opposition and to hold the associated coil, so that the winding work efficiency is poor. This tendency is conspicuous particularly in the case of an inner rotor type motor. Further, the motor is heavy and difficult to handle because the stator is larger than necessary.

SUMMARY OF THE INVENTION

The present invention as been accomplished in view of the above-mentioned problems and it is an object of the invention to provide a radial gap type cylindrical motor which permits the reduction of weight and an increase in the number of slot without impairing the characteristics of the motor.

According to the present invention, in order to achieve the above-mentioned object, in a motor structure including a rotor, the rotor having a field magnet and being held rotatably, and stator poles having salient poles opposed to the field magnet of the rotor, there is provided an improvement further including a magnetic flux density adjusting yoke formed in a cylindrical shape using a soft magnetic material and having salient poles, half the number of the salient poles being projected as upper salient poles on an inner upper edge of the yoke inwardly at an equal angle and the remaining half of the salient poles being projected as slower salient poles on an inner lower edge of the yoke inwardly at an equal angle so as not to overlap the upper salient poles vertically, and driving coils would respectively around the upper and lower salient poles. In combination with this motor structure there also is provided a motor structure further including an upper stator yoke formed in the shape of a cup using a soft magnetic material and having inwardly projecting salient poles formed on the bottom thereof, the upper stator yoke being superimposed on the upper side of the magnetic flux density adjusting yoke so that the salient poles thereof are aligned with the upper salient poles of the magnetic flux density adjusting yoke, a lower stator yoke formed in the shape of a cup using a soft magnetic material and having inwardly projecting salient poles formed on the bottom thereof, the lower stator yoke being superimposed on the lower side of the magnetic flux density adjusting yoke so that the salient poles thereof are aligned with the lower salient poles of the magnetic flux density adjusting yoke, and driving coils wound respectively around the superimposed portions of the upper salient poles and the superimposed portions of the lower salient poles. The magnetic flux density adjusting yoke and the stator yokes may be formed using a polymeric material containing a soft magnetic powder or using a sintered metal. The stator portion, including yokes and driving coils, can be formed integrally by the molding of resin. As the case may be, the stator portion, even including flanges which hold bearings, may be formed by molding.

DESCRIPTION OF THE PREFERRED EMBODIMENTS

Figure 1:
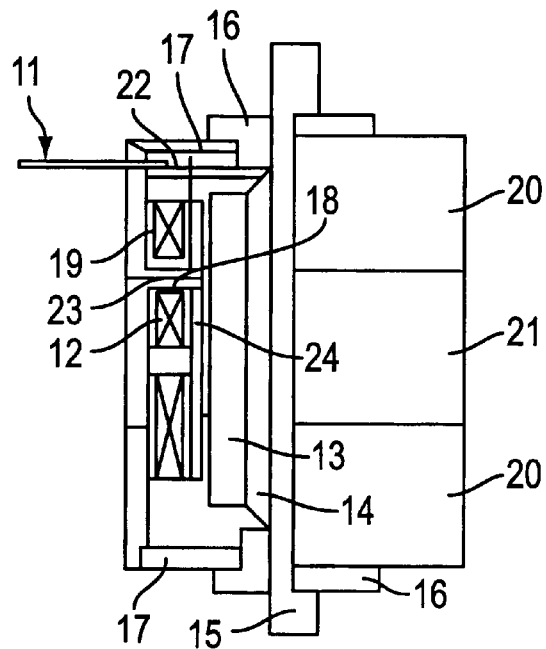
FIG. 1 is a partially cut-away side view showing an embodiment of the present invention.
Figure 2:
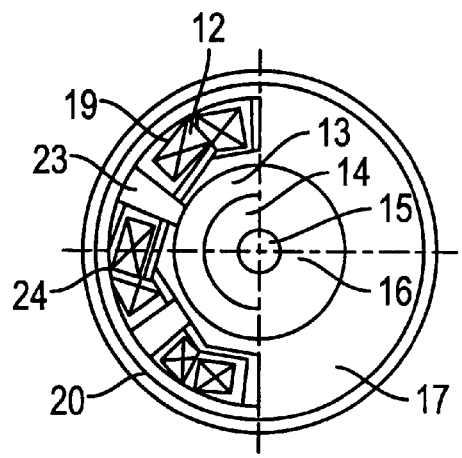
FIG. 2 is a partially cut-away plan view thereof.

Embodiments of the present invention will be described in detail hereinafter with reference to the accompanying drawings. FIGS. 1 and 2 illustrate a motor structure according to an embodiment of the present invention, of which FIG. 1 is a partially cut=away side view thereof and FIG. 2 is a particularly cut-away plan view thereof. In these figures, the reference numeral 11 denotes a lead wire and the numeral 12 denotes a driving coil comprising a bobbin 19 and a magnetic wire wound thereof. Terminal ends of driving coils 12 are connected to a relay plate 22, in which the coils are connected as required, for example in the form of delta connection. Numeral 13 denotes a rotor magnet and numeral 14 denotes a sleeve which connects the rotor magnet 13 with a shaft 15 serving as a rotational center of the rotor magnet 13.

Figure 3:
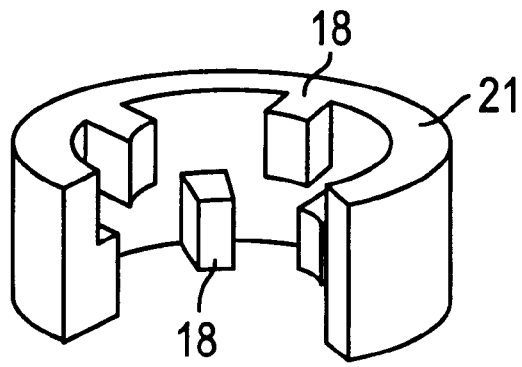
FIG. 3 is a partially cut-away perspective view of a magnetic flux density adjusting yoke.
Figure 4:
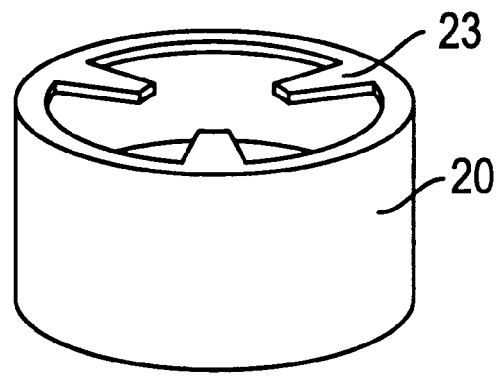
FIG. 4 is a perspective view of a stator.

A flange 17 is fixed to an end face of a lower stator yoke 20, with a bearing 16 disposed centrally, with which bearing supports the rotor shaft 15 rotatably. A pole plate 24 for collecting a lot of interlinkage flux with the rotor magnet 13 is fitted on the tip of each salient pole 23. As shown in FIG. 4, the stator yoke 20 is formed by deep-drawing a soft magnetic steel plate in the shape of a cup and forming salient poles 23 radially on the bottom thereof by only half of the number required for the motor. Between upper and lower stator yokes 20 is disposed a magnetic flux adjusting yoke 21 which is formed by molding of a soft magnetic powder. As shown in FIG. 3, the yoke 21 is cylindrical and at both end faces thereof are formed salient poles 18 radially by the same number as the number of the salient poles 23 of the stator yokes 20. When looking in the axial direction, it is seen that the said number of salient poles corresponds to the number required for the motor. Further, when the magnetic flux density adjusting yoke 21 is seen in a developed view, it is seen that the salient poles 18 are arranged in a zigzag fashion.

Figure 5:
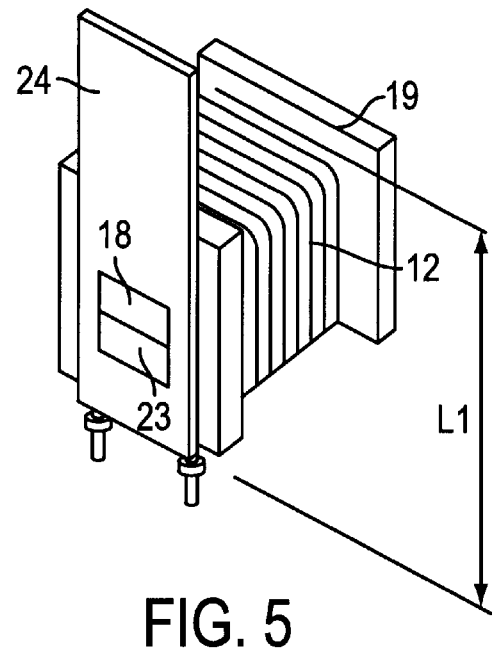
FIG. 5 is a perspective view of a bobbin with a coil wound thereon and a pole plate attached thereto.

FIG. 5 is an enlarged perspective view showing a bobbin 19 with a driving coil 12 wound thereon and also showing a pole plate 24 fixed to an end portion of the bobbin 19. As is seen from the same figure, a hole for fitting therein of salient poles 18 and 23 is formed in the pole plate 24, whose hole is in communication with a salient insertion hole of the bobbin 19. The state shown in FIG. 5 is with the salient poles 18 and 23 inserted into those holes. The length L1 in the longitudinal direction of the pole plate 24 is almost equal to that of the rotor magnet which constitutes the rotor.

Figure 6:
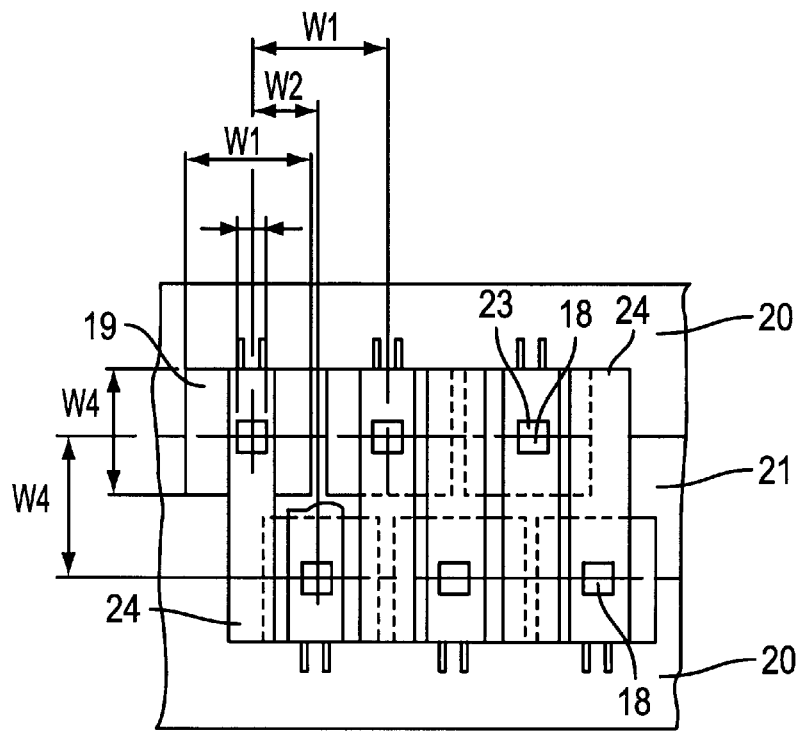
FIG. 6 is a developed view of the stator.
Figure 13:
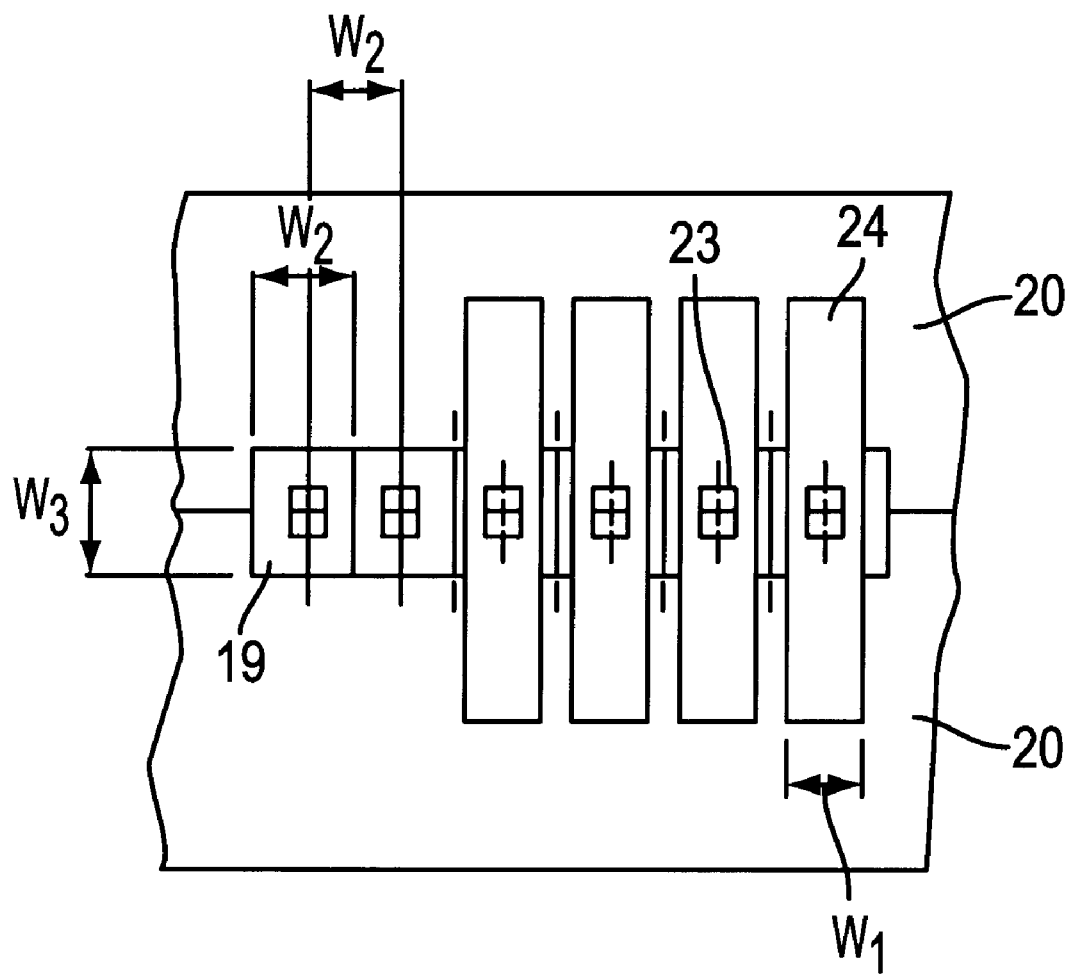
FIG. 13 is a developed view of a conventional stator

A brief description will now be given about thr method for assembling the motor. As shown in FIG. 1, the upper and lower stator yokes 20 are put respectively on the upper and lower sides of the magnetic flux adjusting yoke 21 in such a manner that the salient poles 18 of the magnetic flux adjusting yoke 21 and the salient poles 23 of the stator yokes 20 are in a superimposed relation to each other. Thereafter, the bobbins 19 with coils 12 wound thereon and with poles plates 24 fixed to end portions thereof are fitted and fixed to the superimposed portions of the salient poles 18 and 23 in an alternate manner, as shown in FIG. 6. FIG. 6 shows the stator in a developed view. FIG. 13 shows a conventional example in which the same number as that in FIG. 6, i.e. six, of magnetic poles are arranged at equal intervals and in which salient poles are arranged on the same plane. In this embodiment of the present invention, as shown in FIG. 6, the magnetic flux adjusting yoke 21 is disposed between the stator yokes 20, and the salient poles 18 formed inside the yoke 21 are arranged in a zigzag fashion, whereby the salient poles can be arranged alternately in the vertical direction. In the conventional example wherein salient poles are arranged laterally in one row, the width W2 of each bobbin 19 must be set equal to the salient pitch, as shown in FIG. 13. On the other hand, in the embodiment of the present invention illustrated in FIG. 6, the width W1 of each bobbin 19 can be set to the spacing of salient poles 23 of each stator yoke 20, namely, a spacing (W1≦2×W2) twice as large as the spacing W2 shown in FIG. 13.

In the conventional motor structure shown in FIG. 13, the coil winding space and a longitudinal length W3 of each bobbin depend on the value of spacing W2, while in the embodiment of the invention illustrated in FIG. 6 it is possible to make expansion up to the same size as a longitudinal spacing W4 to salient poles if W1 is equal to W4. Consequently, a larger volume of winding than in the prior art can be formed on each bobbin. By adjusting the length of each stator yoke 20 and that of the magnetic flux adjusting yoke 21 it is possible to make each bobbin equal in both length and width, namely square in shape, thus permitting an ideal winding of coil for the bobbin.

Figure 7:
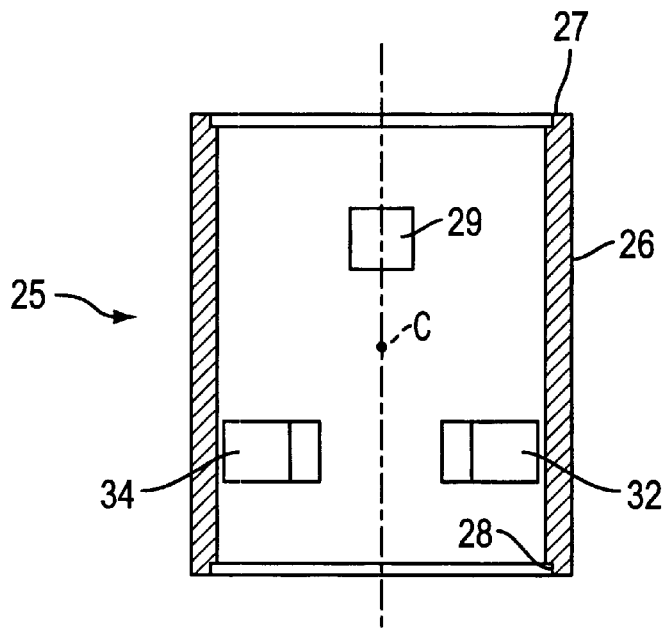
FIG. 7 is a sectional view of a magnetic flux density adjusting yoke used in another embodiment of the present invention.
Figure 8:
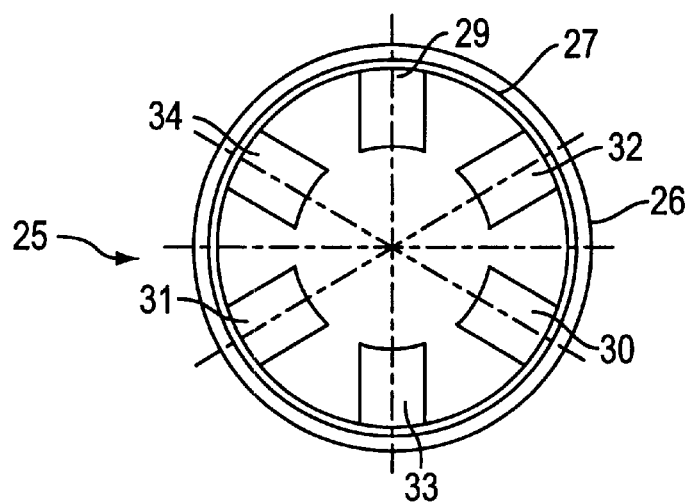
FIG. 8 is a plan view thereof.

Referring now to FIGS. 7 and 8, there is illustrated another embodiment. This embodiment is different from the previous embodiment in that stator yokes are not disposed above and below a magnetic flux adjusting yoke 25. The whole of the magnetic flux density adjusting yoke 25 is formed by integral molding with use of a sintered metal or a polymeric material containing a soft magnetic powder. The magnetic flux density adjusting yoke 25 has a cylindrical yoke portion 26. with grooves 27 and 28 being formed inside the upper and lower ends, respectively, of the yoke portion 26 to permit flanges to be fitted therein. The flanges are for holding bearings which support a shaft. At intermediate positions between an inside central point C of the cylindrical yoke portion 26 and the upper groove 27 there are formed salient poles 29, 30 and 31 inwards at an equal angel by only half the total number (six) of salient poles. Only the salient pole 29 is seen in the sectional view of FIG. 7. Further, at intermediate positions between the inside central point C of the cylindrical yoke portion 26 and the lower groove 28 there are formed salient poles 32, 33 and 34 inwards at an equal angle by only half the total number (six) of salient poles. Two salient poles 32 and 34 are seen in the sectional view of FIG. 7. As in the previous embodiment, a rotor magnet is used also in this embodiment, but a detailed explanation thereof is here omitted to avoid tautology. Thus, the structure is simple in this embodiment because stators are integrally up and down with the magnetic flux density adjusting yoke 25.

Figure 9:
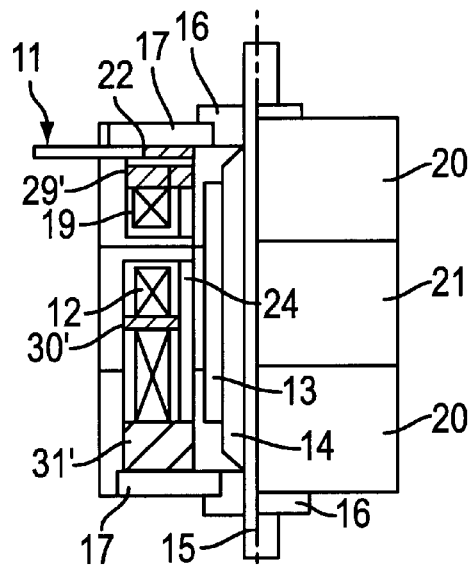
FIG. 9 is a sectional view of a motor formed by molding according to a further embodiment of the present invention.

Referring now to FIG. 9, there is illustrated a motor structure further embodying the invention. In this embodiment, stators 20, including driving coils 12 on bobbins 19 and pole plates 24, and a magnetic flux density adjusting yoke 21, are formed integrally by insert molding. Therefore, as is apparent from FIG. 9, pre-formed spaces are filed with inserted resins 29', 30' and 31'. In this embodiment, the same portions as in the previous embodiments are identified by like reference numeral sand explanations thereof will be omitted.

Figure 10:
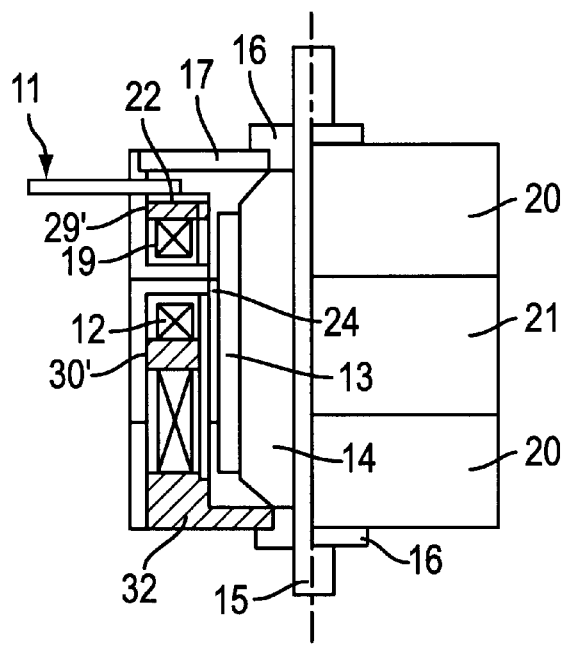
FIG. 10 is a sectional view of a motor formed by molding according to a still further embodiment of the present invention.
Figure 11:
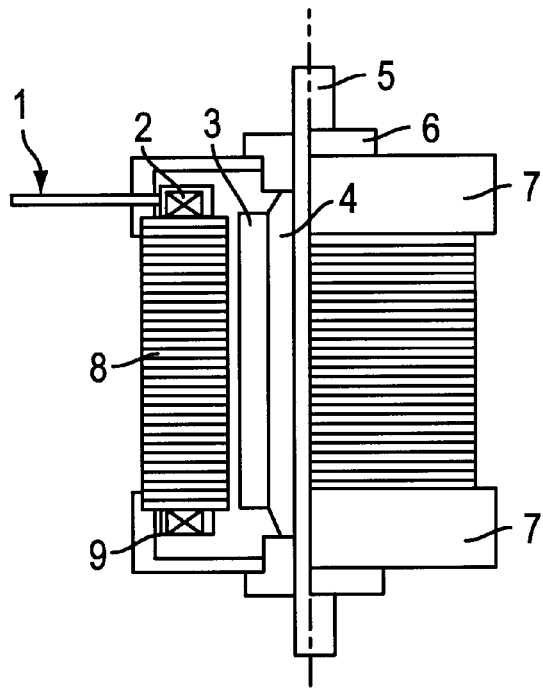
FIG. 11 is a partially cut-away side view of a conventional motor.
Figure 12:
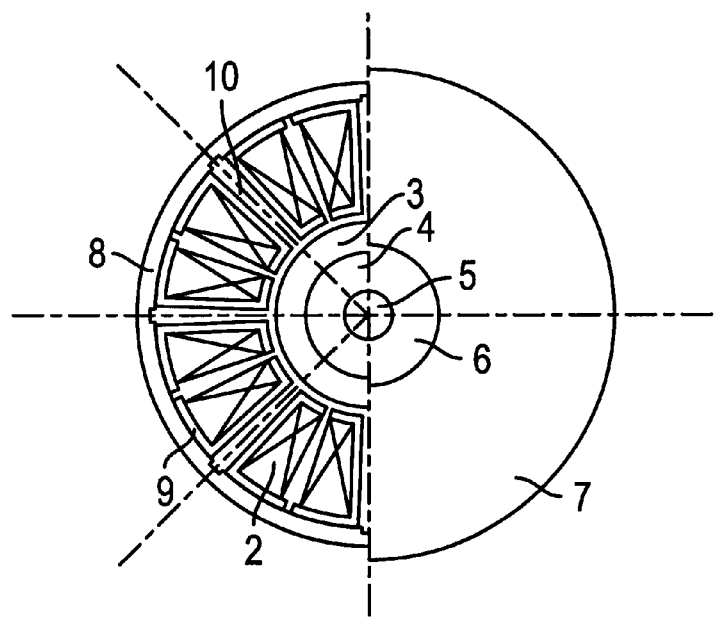
FIG. 12 is a partially cut-away plan view of the conventional motor.

Referring now to FIG. 10, there is illustrated a motor structure according to a still further embodiment of the invention, in which not only stators 20, including driving coils 12 on bobbins 19 and pole plates 24, are integrally formed by insert molding as in the embodiment just described above, but also a flange 32 which holds a lower bearing 16 is also formed using a resin. In this embodiment, the same portions as in the previous embodiments are identified by like reference numerals and explanations thereof will be omitted.

Figure 14:
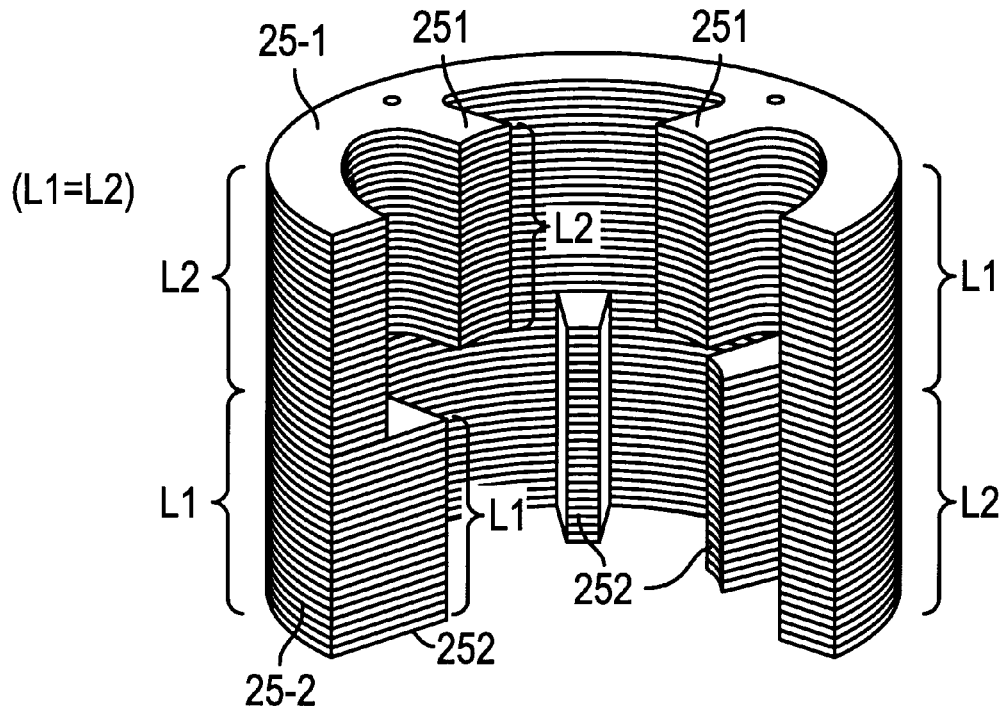
FIG. 14 is a partially cut-away a perspective view of the further more embodiment of the present invention.

Referring to FIG. 14, the magnetic flux density adjusting yoke 5 is separated by two parts, one is an upper yoke 25-1 and other is lower yoke 25-2. And heights of them are the same. Salient poles 251 and 252 of the upper and lower yokes 25-1 and 25-2 are shifted with electric angels of 180 degrees mutually. Salient poles 251 and 252 of the upper and lower yokes 25-1 and 25-2 are formed by lamination of soft magnetic steel plates. So that, the motor assembling is more simple and easier.

Figure 15:
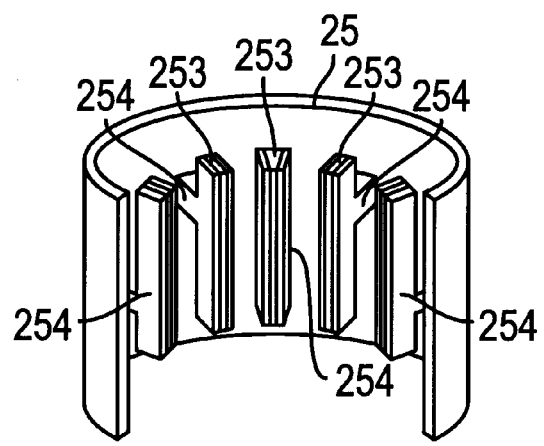
FIG. 15 is a partially cut-away a perspective view of the still more embodiment of the present invention.

Referring to FIG. 15, salient poles 254 having pole plate 253 of the magnetic flux density adjusting yokes 25 are formed by laminated soft magnetic steel plates stacked to circumferential direction of the magnetic flux density adjusting yokes 25 and adjoined driving coils 12 are not aligned to circumferential direction of the magnetic flux density adjusting yokes 25.

Although the present invention has been described above by way of embodiments thereof, various modifications and applications may be made within the scope of the invention, which modifications and applications are not excluded from the scope of the present invention.

According to the present invention, as set forth hereinabove, the volume of salient poles can be kept to a minimum required, so even if the number of slots (poles) is increased and even if the motor size is reduced, it is possible to ensure a large coil space. Not only the reduction in weight of the motor can be attained, but also the characteristics of motor constituents, e.g. rotor magnet, can be utilized up to the limit, and thereof it is possible to constitute a motor of high efficiency at low cost.

What we claim is:

1. A motor structure including a rotor having a field magnet and being held rotatably between two flanges fixed at ends of a yoke, and stator poles having salient poles opposed to the field magnet of the rotor, comprising:

a magnetic flux density adjusting yoke formed in a cylindrical shape using a soft magnetic material and having salient poles having a sectional square, half the number of the salient poles being projected as upper salient poles on an inner upper edge of the yoke inwardly at an equal angel and the remaining half of the salient poles being projected as lower salient poles on an inner lower edge of the yoke inwardly at an equal angle so as not to overlap the upper salient poles vertically and horizontally;

an upper stator yoke formed in the shape of a cup using a soft magnetic material and having inwardly projecting salient poles having a sectional square formed on the bottom thereof, the upper stator yoke being superimposed on the upper side of the magnetic flux density adjusting yoke so that the salient poles thereof are aligned with the upper salient poles of the magnetic flux density adjusting yoke;

a lower stator yoke formed in the shape of a cup using a soft magnetic material and having inwardly projecting salient poles having a sectional square formed on the bottom thereof, the lower stator yoke being superimposed on the lower side of the magnetic flux density adjusting yoke so that the salient poles thereof are aligned with the lower salient poles of the magnetic flux density adjusting yoke;

a rectangular pole plate composed to the top of the salient poles; and driving coils wound respectively around the superimposed portions of the upper salient poles and the superimposed portions of the lower salient poles.

2. A motor structure according to claim 1, wherein said magnetic flux density adjusting yoke is separated into two magnetic flux density adjusting yokes each having half the number of salient poles in the direction of a shaft of the rotor, and salient poles of the two magnetic flux density adjusting yokes are shifted with angles of 180 degrees mutually.

3. A motor structure according to claim 2, wherein said magnetic flux density adjusting yokes are formed by lamination of soft magnetic steel plates.

4. A motor structure according to claim 1, wherein said salient poles are formed by laminated soft magnetic steel plates stacked to circumferential direction of said magnetic flux density adjusting yokes and adjoined driving coils are staggered in a circumferential direction of said magnetic flux density adjusting yokes.

5. A motor structure according to claim 1, wherein said upper stator yoke and said lower stator yoke are formed using a polymeric material containing a soft magnetic powder.

6. A motor structure according to claim 1, wherein said upper stator yoke and said lower stator yoke are formed using a sintered metal.

7. A motor structure according to claim 1, wherein said upper stator yoke, said lower stator yoke, said pole plate and driving coils, are formed integrally by the molding of resin.

8. A motor structure according to claim 1, wherein one of said two flanges is molded with one of said upper stator yoke and said lower stator yoke by resin.

* * * * *

UNITED STATES PATENT AND TRADEMARK OFFICE
CERTIFICATE OF CORRECTION

PATENT NO. : 6,140,726
DATED : October 31, 2000
INVENTOR(S) : Yuzuru SUZUKI, et al.

It is certified that error appears in the above-identified patent and that said Letters Patent is hereby corrected as shown below:

ON THE TITLE PAGE
Item [57]   Abstract
    line 6, after "of" insert --the--.

Col. 1, line 45, change "motors" to --motor--.

Col. 2, line 16, change "slower" to --lower--.
    line 18, change "would" to --wound--.

Col. 3, line 16, change "cut=away" to --cut-away--;
    line 17, change "particularly" to --partially--;
    line 57, change "thr" to --the--; and
    line 64, change "poles" to --pole--.

Col. 4, line 16, change "≤" to -- = --.
    line 23, delete "to" (first occurrence);
    line 44, change "angel" to --angle--.

Col. 5, line 12, change "5" to --25--;
    line 15, change "electric angels" to --electrical angels-- and

UNITED STATES PATENT AND TRADEMARK OFFICE
CERTIFICATE OF CORRECTION

PATENT NO. : 6,140,726        Page 2 of 2
DATED : October 31, 2000
INVENTOR(S) : Yuzuru SUZUKI, et al.

It is certified that error appears in the above-identified patent and that said Letters Patent is hereby corrected as shown below:

line 52, change "angel" to --angle--.

Signed and Sealed this

Eighth Day of May, 2001

*Attest:*

NICHOLAS P. GODICI

*Attesting Officer*      *Acting Director of the United States Patent and Trademark Office*